United States Patent Office 2,735,904
Patented Feb. 21, 1956

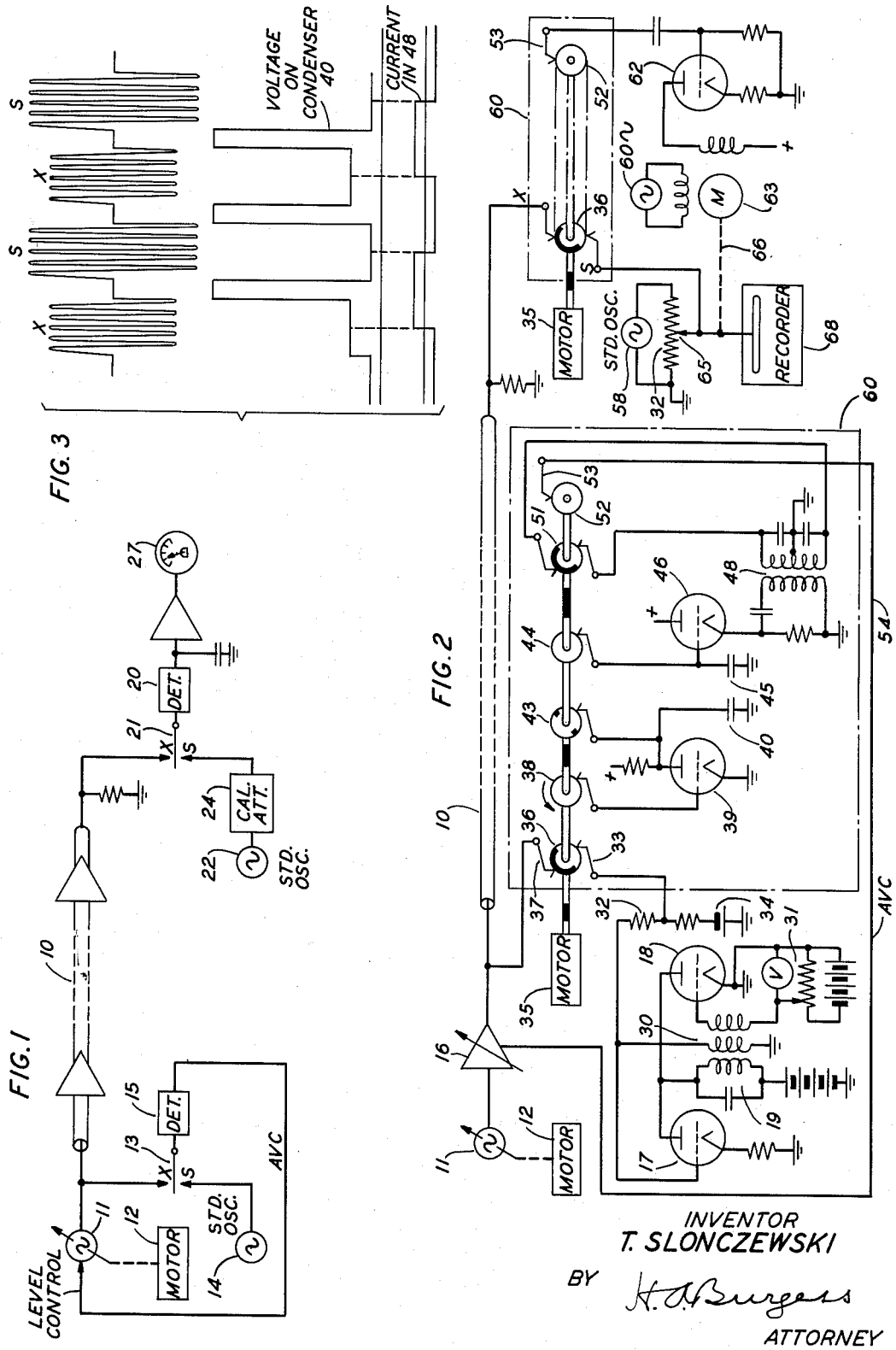

2,735,904

MEASUREMENT OF TRANSMISSION LEVEL OF LINES

Thaddeus Slonczewski, Summit, N. J., assignor to Bell Telephone Laboratories, Incorporated, New York, N. Y., a corporation of New York Application November 7, 1952, Serial No. 319,386

3 Claims. (Cl. 179—175.3)

The present invention is concerned with measurement of the transmission characteristics of a long line to a relatively high degree of accuracy (small fraction of a decibel) with no connection between the source of test waves and the detector other than the unknown.

In a long repeatered toll line, one example being a coaxial line, the output level is of the same order as the input level, the attenuation introduced by the line being made up by the gain in the repeaters. The input test wave may be a fraction of a volt in magnitude, the output or received wave also being a fraction of a volt. It is desired to maintain a constant absolute level of input test waves and to be able to detect and measure the absolute level of the received waves and small changes in received level with time.

The maintenance of constant input level and the measurement of the received waves both involve the use of a rectifier, thus posing a problem the successful solution of which is one of the aims of the present invention.

Any rectifier has inherent in its nature or necessarily associated with its use variables which are appreciable in comparison with the fractional-volt magnitudes of the waves used in testing and measuring lines. This fact renders rectifiers unsuitable for determining absolute values of these relatively small voltages by simply measuring the detected output.

The present invention takes advantage of the fact that the characteristics of a rectifying detector hold sufficiently constant over a brief interval such as a small fraction of a second to permit its use in a comparison measurement with high accuracy.

In accordance with one feature of this invention a detector is used in a comparison circuit in which the known and unknown voltages are applied alternately to the detector in rapid succession, in the measurement of absolute values.

This and other features are used in carrying out the main object of the invention which is to accomplish accurate measurement of the transmission characteristics of a long line with no connection except the line between the test source and the detector.

In carrying out the invention in a typical case the test oscillator used at the far end, here the transmitting end, of a line under test has an automatic level control for maintaining constant input level into the line. A portion of the test oscillator output wave is detected to provide a direct current voltage for the automatic level control. In order to avoid introducing detector errors into this control voltage, the detector is used in a comparison circuit and the oscillator output is always kept at or brought back to equality with a standard comparison voltage, the detector being switched rapidly between known and unknown.

At the receiving or near end of the line a similar detector is used and its input is rapidly switched between the line and a standard of comparison similar to that used at the far end. A calibrated attenuator may be used to produce a null in the detector output, in which condition the overall line attenuation is equal to the loss in the calibrated attenuator. Since the two standards of comparison at opposite ends of the line can be made equal to a high degree of accuracy, the measurement of line loss is determined by absolute measurement and with detector errors substantially eliminated.

The invention will be more fully described in connection with the drawing in which:

Fig. 1 is a block diagram of an overall system to which the invention is applied;

Fig. 2 is a schematic circuit diagram illustrating in more detail how the invention may be applied to such a system; and Fig. 3 shows wave shapes to be discussed in connection with the description of operation of certain devices in Fig. 2.

Referring to Fig. 1, the line 10 may be a long transmission line such as a coaxial line and may include a succession of repeaters as indicated. Its transmission characteristic can be measured by use of a swept frequency wave from an oscillator 11 covering in its sweep the entire transmission frequency range of the line. Usually in prior art practice it has been found necessary to use an auxiliary line to form with the line 10 a loop circuit so that variations in level of the test wave could be compensated in the final measurement. If it were possible to know the absolute level of the oscillator output and to measure the absolute level of the received waves at the opposite end of the line, accurate measurements could be made of the line characteristic with no connection between the terminals other than the line under test.

The invention aims to do this by providing at both transmitter and receiver special equipment devised to maintain constant the absolute level of the transmitting oscillator and to measure the absolute level of the received waves at the receiving end.

The oscillator 11 has its tuning varied in cyclical manner by a mechanical drive from motor 12 to either a variable inductance or variable capacity in its frequency determining circuit in known manner. A switch 13 is operated at a rate of say, 60 times a second, to switch the input of detector 15 alternately between the output of the swept frequency oscillator 11 and the output of a standard oscillator 14, the latter generating a single frequency only and having means for holding its output level at constant value. The output of detector 15 is used to control the gain of the oscillator 11 to hold its output at the same level as that of the standard 14. For this purpose an AVC connection is used from the output of detector 15 to a suitable control element associated with oscillator 11. The frequency of the standard or comparison oscillator 14 may have a convenient value best suited for constant level maintenance, such as 100 kilocycles per second by way of illustration. It need not have any particular relation to the frequency of oscillator 11.

At the receiving end of the line, the received wave is applied to detector 20 by a vibrating switch 21 which in alternate periods applies waves from a standard source 22 through a calibrated attenuator 24. When the level of the received waves is equal to that of the waves on the output side of the attenuator 24, the detector circuit is arranged to have a zero output current. The calibrated attenuator 24 is therefore varied until the meter 27 reads zero, in which case the line attenuation is directly read from a scale on the attenuator.

Referring now to Fig. 2, a more detailed description of the apparatus provided by the invention at each terminal of the line 10 will be given.

At the transmitting terminal, shown at the left, the constant level or standard oscillator comprises tubes 17 and 18, the tube 17 constituting the oscillation generator tube proper and the tube 18 serving as a control tube for holding the output level constant. The frequency determining resonant circuit is at 19, back-coupled to the grid through windings of transformer 30. The loss which fixes the maximum amplitude of the generated wave is provided in this instance not by tube 17 but by tube 18. The latter has its grid coupled to the LC circuit 19 by transformer 30 and has its plate circuit connected across the plate circuit of tube 17. The slider on potentiometer resistance 31 is set so that normally the grid of tube 18 is driven positive in each cycle a sufficient amount to limit the maximum amplitude of the oscillation due to grid losses in the circuit of tube 18. If there is a tendency for the voltage across the circuit 19 to increase, such tendency is opposed by the accompanying increase in plate circuit losses in tube 18, and vice versa, these losses damping the LC circuit. This in itself is a known method of regulating an oscillator output at constant level. The level at which the circuit regulates can be changed by changing the position of the slider on the resistance 31. An output lead from a suitable point in the circuit is taken to brush 33 of the rotary switch to be described. For this purpose a tap is taken from resistor 32 and a bias battery 34 is included for the grid of tube 39.

In my prior application Serial No. 252,390 filed October 20, 1951 for Measuring Apparatus, there is shown in detail a mercury switch and control mechanism therefor which could be used in the present system in place of the switches 13 and 21 of Fig. 1 of this application. Where the requirements are less severe a somewhat simpler form of switch can be used such as that which is shown in Fig. 2. Here a motor 35 drives a shaft on which are mounted a succession of commutating disks and slip rings. The first disk, starting from the motor end, is at 36 and comprises an insulated segment slightly longer than 180 degrees with oppositely disposed brushes 33 and 37. This cooperates with slip ring 38 to connect the output of amplifier 16 and the standard oscillator in rapid alternation to the grid of rectifier or detector 39. By making the insulating segment slightly more than half the circumference of disk 36 direct connection from brush 37 to brush 33 at any time is avoided.

The waves applied alternately to the grid of tube 39 in this manner are rectified and cause direct current voltages correspondingly varying in value to be put on condenser 40. Referring to the graphs on Fig. 3, the upper graph represents the alternately applied standard (S) and test (X) waves during a brief interval in which the test waves are assumed to have smaller amplitude than the standard waves. (For convenience in drafting no difference in frequency is assumed.) Brief interruptions occur when neither wave is applied to the rectifier and during these times the voltage on condenser 40 shown by the middle graph jumps to a high value due to removal of the load on the grid which normally causes current to be drawn through the plate feed resistor. Condenser 40 has a relatively small capacity, its function being to filter out the high frequency component of the applied waves. As soon as the high frequency waves are reapplied to the rectifier grid, the voltage on condenser 40 quickly assumes a value determined by the amplitude of the applied alternating current wave.

The commutator 43 and slip ring 44 are for the purpose of sampling the voltage existing on condenser 40 at times when this voltage has attained a steady value determined by the input applied to the rectifier, and transferring such voltage to the storage condenser 45 in the grid circuit of cathode-follower stage 46. The short insulation inserts in disk 43 prevent sampling the voltage on condenser 40 during presence of one of the voltage spikes, Fig. 3, middle graph. The inserts are made long enough to confine sampling times to the periods when the voltage on condenser 40 is free of the effects of these spikes. The current in the primary winding of the output transformer 48 of tube 46 has the general form shown in the bottom graph of Fig. 3. It should be noted that this wave would be zero if the S-wave were exactly equal to the X-wave.

The commutator disk 51 with its slip ring 52 together operate as a synchronous rectifier for the wave in the secondary winding of transformer 48. The opposite-polarity terminals of this winding are led to brushes on disk 51. Let it be assumed that for the wave shown on Fig. 3, lowest graph, the voltage on brush 53 is positive as a result of the rectifying action of commutator 51. This positive voltage is applied over AVC lead 54 to the variable-gain amplifier 16 and increases its gain to bring the output wave X more nearly into equality with the wave S from the standard oscillator. When exact equality is reached the voltage on brush 53 reduces to zero. If it is assumed that the test wave X has greater amplitude than the standard S, a negative voltage is developed at the brush 53 which when applied over the AVC lead 54 reduces the gain of amplifier 16.

Considering further the transmitting circuit, the standard level oscillator 17 is controlled by tube 18 which essentially operates as a rectifier. However, the peak voltage developed across the transformer winding in its grid circuit can be of the order of 150 volts, for example, the voltage taken off from the resistor 31 being enough different from this value to permit proper grid-rectifying action to occur in tube 18. The rectifier is sufficiently stable in its operation to serve its purpose in controlling the oscillator output where large voltages are involved.

The rectifier 39 however has an impressed alternating current grid voltage of only a small fraction of a volt, e. g. 0.3 volt. The rectifier element electromotive force is appreciable in comparison with 0.3 volt and is not stable with time and temperature. It has been found, however, that a detector does not drift as much as .0001 decibel in one-sixtieth of a second and is thus sufficiently stable when used to compare the standard and test voltages at a switching rate of 60 cycles per second.

As one of the two input voltages is removed and replaced by the other, the large voltage peaks shown in Fig. 3 occur during the off periods when neither voltage is present. By allowing time for these to become dissipated and for the voltage on condenser 40 to assume its new value corresponding to the impressed wave before the voltage is taken off from condenser 40 for use, the effect of these peaks and of switching transients is avoided. Additional filtering could be used at 40 if desired such as a shunt condenser and series resistance forming with condenser 40 a low pass filter section. Also if desired a cathode-follower tube could be inserted between the brush on slip ring 44 and the grid of tube 46 to provide condenser 45 with a low impedance charging circuit to decrease the time required to reach its steady-state voltage. In order to provide a rate of comparison and sampling of sixty times per second, the commutating disks are rotated at 30 revolutions per second. This causes 60 cycle pulses to be produced in transformer 48 when there is inequality between the S-wave and X-wave voltages.

At the receiving end of line 10 the apparatus is essentially the same as has been described as used at the transmitting terminal. Standard oscillator 58 may be the same as that at the transmitter comprising tubes 17 and 18 and their associated circuitry. The rotary switch driven by motor 35 may be a duplicate of that already described, and all apparatus included within dashed rectangle 60 is the same in both terminals.

Waves from the standard oscillator 58 are compared against received waves and when there is inequality between them a 60-cycle wave having an amplitude and phase dependent upon the inequality appears on brush 53 and is applied to amplifier 62 which drives one winding of a two-phase motor, the other phase of which is supplied by constant amplitude 60-cycle current. The rotor 63 will be stationary or will turn clockwise or counter-clockwise according as the wave on brush 53 is zero or has one phase or the opposite phase. As the rotor 63 turns it moves the slider 65 along potentiometer resistance 32 by a mechanical coupling indicated at 66 which may include a feed screw and traveling nut or other suitable mechanical drive. When the slider has moved sufficiently to restore equality between the X-wave and the S-wave, the motor 63 stops. The position of the slider at all times is recorded on a sheet of scaled paper in the recorder 68 in accordance with known practice.

In using the invention to test line 10, the motor (not shown) controlling the movement of the paper in the recorder 68 is coordinated with the motor 12 driving the sweep control of the sending oscillator and with the scale on the paper so that the recorder pen will plot a curve between level change and frequency. As portrayed on the drawing the scaled recording paper could be moved vertically at the rate at which the frequency of the sending oscillator is swept over the transmission range of the line, and the pen would be moved horizontally to indicate changes in level.

Relay type switches or vibratory switch contacts could be used in place of the rotary switches which have been shown. Various other modifications can be made within the spirit and scope of the invention. The 60-cycle rate of switching was chosen partly for convenience in view of the common use of 60-cycle current in power supplies, and in any case as being high enough to eliminate the effects of variable rectifier operation, but the invention is not to be construed as limited to this value or to other numerical quantities referred to.

What is claimed is:

1. In a testing system, a test oscillator of variable frequency, a constant output constant frequency source, a level control for said oscillator, means for periodically comparing the outputs of said oscillator and said source and means to actuate said level control in accordance with changes in the output of said comparing means whereby the output of said oscillator is kept practically constant, a circuit to be tested connected to receive the output variable frequency constant level waves from said oscillator, a detector, a second constant output constant frequency source, a calibrated attenuator in the output of said second source, a switch for periodically connecting said detector alternately to receive the output waves from said circuit under test, and the output waves from said attenuator, an indicator in the output of said detector, and means operating said periodically comparing means and said switch at a sufficiently high rate to substantially eliminate the effects on the output waves of variable operation of said comparing means and said detector.

2. In a testing system, geographically separated stations having a communication channel between them, a transmitter for applying to said channel at a first station a test wave of continuously varied frequency having an amplitude of the order of a fraction of a volt, a rectifier, a source of constant level constant frequency waves, switch means for alternately applying to said rectifier said test wave and said constant level wave, means controlled by the output current of said rectifier for regulating the amplitude of the applied test wave, a rectifier and a similar source of constant frequency constant level waves at the second station, switch means for alternately applying to said rectifier at said second station the test waves received thereat over said channel and the waves from the similar source thereat in rapid alternation, an indicator operated by the output current of said latter rectifier, each of said rectifiers having an element electromotive force which is appreciable in comparison with the voltage of said waves and which is variable with time and temperature, and means for eliminating error of measurement due to said electromotive force comprising means to actuate each of said switches at a rate of several times ten alternations per second.

3. The combination claimed in claim 2 including means connected between the rectifier and the amplitude regulating means at the first station and means connected between the rectifier and said indicator at the second station for suppressive voltage peaks resulting from operation of said respective switch means.

No references cited.